United States Patent
Hasegawa et al.

(10) Patent No.: US 8,636,351 B2
(45) Date of Patent: Jan. 28, 2014

(54) INKJET INK, INK CARTRIDGE CONTAINING THE INKJET INK, INKJET RECORDING APPARATUS USING THE INKJET CARTRIDGE, AND PRINT FORMED BY THE INKJET INK

(71) Applicants: Shin Hasegawa, Shizuoka (JP); Hiroyuki Fushimi, Shizuoka (JP)

(72) Inventors: Shin Hasegawa, Shizuoka (JP); Hiroyuki Fushimi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/760,317

(22) Filed: Feb. 6, 2013

(65) Prior Publication Data

US 2013/0258005 A1  Oct. 3, 2013

(30) Foreign Application Priority Data

Mar. 30, 2012 (JP) .................. 2012-078741

(51) Int. Cl.
*G01D 11/00* (2006.01)

(52) U.S. Cl.
USPC ......................................... 347/100

(58) Field of Classification Search
USPC .............................. 347/86, 87, 100
See application file for complete search history.

(56) References Cited

U.S. PATENT DOCUMENTS

| | | | | |
|---|---|---|---|---|
| 5,098,883 | A * | 3/1992 | Aono ............................ | 503/227 |
| 8,317,913 | B2 * | 11/2012 | Hatada et al. .............. | 106/31.59 |
| 2003/0196571 | A1 | 10/2003 | Hakiri et al. | |
| 2004/0138337 | A1 | 7/2004 | Hasegawa et al. | |
| 2006/0209149 | A1 | 9/2006 | Hasegawa et al. | |
| 2006/0272543 | A1 | 12/2006 | Hakiri et al. | |
| 2008/0036830 | A1 | 2/2008 | Natori et al. | |
| 2008/0036840 | A1 | 2/2008 | Hakiri et al. | |
| 2008/0138519 | A1 | 6/2008 | Habashi et al. | |
| 2010/0277548 | A1 | 11/2010 | Hakiri et al. | |
| 2010/0302306 | A1 | 12/2010 | Hasegawa et al. | |
| 2010/0309260 | A1 | 12/2010 | Hakiri et al. | |
| 2011/0071250 | A1 | 3/2011 | Naruse et al. | |
| 2011/0074865 | A1 | 3/2011 | Hasegawa et al. | |
| 2011/0267398 | A1 | 11/2011 | Hakiri et al. | |
| 2012/0026237 | A1 | 2/2012 | Hakiri et al. | |
| 2012/0062646 | A1 | 3/2012 | Hasegawa et al. | |
| 2012/0154492 | A1 | 6/2012 | Hakiri et al. | |
| 2012/0207984 | A1 | 8/2012 | Hasegawa et al. | |
| 2012/0242741 | A1 | 9/2012 | Hasegawa et al. | |
| 2013/0038660 | A1 | 2/2013 | Hasegawa et al. | |

FOREIGN PATENT DOCUMENTS

| | | |
|---|---|---|
| JP | 8-333531 | 12/1996 |
| JP | 11-349873 | 12/1999 |
| JP | 2005-254611 | 9/2005 |
| JP | 2006-077232 | 3/2006 |
| JP | 2007-146167 | 6/2007 |

(Continued)

*Primary Examiner* — Anh T. N. Vo
(74) *Attorney, Agent, or Firm* — Oblon, Spivak, McClelland, Maier & Neustadt, L.L.P.

(57) ABSTRACT

The inkjet ink includes at least a carbon black, a surfactant, a polyether-modified silicone oil having a polyoxyalkylene group in a side chain thereof, an anionic self-emulsifying polyether-modified polyurethane resin having a polyoxyalkylene group in a main chain thereof, and water. The inkjet ink contains particles having a particle diameter of not less than 0.5 μm in an amount of from 500,000 to 2,000,000 pieces per 5.0 μl, and has a volume average particle diameter (D50) of from 80 nm to 120 nm and a 90% cumulative particle diameter (D90) of from 160 nm to 200 nm.

7 Claims, 4 Drawing Sheets

(56) References Cited

FOREIGN PATENT DOCUMENTS

| | | |
|---|---|---|
| JP | 2007-217472 | 8/2007 |
| JP | 2010-125839 | 6/2010 |
| JP | 2010-261028 | 11/2010 |

\* cited by examiner

INKJET INK, INK CARTRIDGE CONTAINING THE INKJET INK, INKJET RECORDING APPARATUS USING THE INKJET CARTRIDGE, AND PRINT FORMED BY THE INKJET INK

CROSS-REFERENCE TO RELATED APPLICATIONS

This patent application is based on and claims priority pursuant to 35 U.S.C. §119 to Japanese Patent Application No. 2012-078741 filed on Mar. 30, 2012 in the Japan Patent Office, the entire disclosure of which is hereby incorporated by reference herein.

FIELD OF THE INVENTION

The present invention relates to an inkjet ink, an ink cartridge containing the inkjet ink, and an inkjet recording apparatus using the inkjet cartridge. In addition, the present invention relates to a print formed by the inkjet ink.

BACKGROUND OF THE INVENTION

Inkjet image forming methods have advantages over other image forming methods such that the process is simple; full color images can be produced relatively easily; and high resolution images can be produced even when using an inkjet recording apparatus having a simple structure.

Dye-based inks, in which a water soluble dye is dissolved in a medium such as water and mixture solvents of water and an organic solvent, have been typically used as inkjet inks. Such dye-based inks have an advantage such that the colors of images recorded by the inks are clear, but have a drawback such that recorded images have poor light resistance. In contrast, pigment-based inks, in which a pigment such as carbon black and organic pigments is dispersed in a medium, have better light resistance than dye-based inks, and therefore pigment-based inks have been investigated with enthusiasm. However, pigment-based inks have a drawback such that a nozzle clogging problem in that an inkjet nozzle is clogged with ink is caused relatively easily compared to dye-based inks.

Pigment-based inks are typically prepared by a method including preparing a preliminary dispersion in which a pigment (colorant) and a dispersant are preliminarily dispersed in an aqueous medium such as water and alcohols; subjecting the preliminary dispersion to a dispersing treatment using a dispersing device using a media such as sand mills to prepare a dispersion in which the pigment particles have a predetermined particle diameter; and then diluting the dispersion so as to have a predetermined concentration to prepare an ink.

Aqueous pigment-based inks typically include a surfactant or a water-soluble resin to disperse a pigment, which is typically hydrophobic. However, such aqueous pigment-based inks have poor resistance to light and water. Therefore, in order to improve image quality, a particulate resin capable of forming a film is typically included in such aqueous pigment-based inks. However, it is difficult for such an aqueous pigment-based ink that the plural ink components thereof are finely dispersed in the ink for a long period of time. When it is attempted to stably disperse such fine particles in the ink by using a large amount of dispersant such as surfactants, other problems such that air bubbles are formed in an ink tank and a recording head; and image quality deteriorates tend to occur. In addition, in attempting to improve the dispersibility of such fine particles, techniques such that a pigment having a hydrophilic group on the surface thereof is used; or a resin having a hydrophilic group is used for such inks have been proposed. However, a problem in that such a hydrophilic group causes agglomeration of a resin, thereby deteriorating the preservability of the ink is often caused.

In attempting to solve the problems, various techniques have been proposed.

For example, a recording medium for use in pigment-based inkjet recording methods is proposed, which includes a substrate and one or more ink receiving layers located on the substrate, wherein the outermost layer of the ink receiving layers includes ultrafine inorganic particles having an aggregation particle diameter of from 150 nm to 500 nm while including fine particles having an aggregation particle diameter of from 1 μm to 2 μm in a weight ratio of from 5/95 to 50/50, and the glossiness ratio of an image portion of the recording medium to a white portion (non-image portion) of the recording medium is specified. It is described therein that inkjet ink images having good visual property can be produced on the recording medium. In addition, an inkjet recording material is disclosed which includes a colorless or pale-colored solution including an electrolyte, a water-soluble organic solvent and water, and an ink including a pigment self-dispersible in water, an anionic compound, a water-soluble organic solvent, a surfactant and water, wherein the number of particles having a particle diameter of not less than 0.5 μm in 1 liter of the inkjet recording material is not less than $1 \times 10^{11}$ and the number of particles having a particle diameter of not less than 5 nm in 1 liter of the inkjet recording material is not less than $1 \times 10^9$. It is described therein that by performing a heat inkjet recording method using the inkjet recording material, images having a good combination of image density, fixability, preservability and ejection stability can be produced. Further, an aqueous inkjet ink composition is disclosed which includes a pigment wherein at least 70% of the pigment particles have an average particle diameter of less than 0.1 μm with the remaining particles in the ink composition having a particle diameter of 0.1 μm or less, water, an aldehydenaphthalenesulfonate dispersant and/or a sulfone solvent. It is described therein that the ink composition has good stability and can produce high density images.

However, the dispersion stability of the inkjet inks mentioned above is not sufficient. Specifically, when pigments, which are easily damaged by strong impact in a dispersing process, are used for the inks, the resultant inks have poor dispersion stability, resulting in deterioration of the ejection stability of the inks (i.e., stability of ink ejected from an inkjet recording head).

In attempting to improve the ejection stability, an inkjet ink is disclosed which includes a wetting agent, a surfactant, a penetrant and water and in which the water evaporation rate, the increasing rate of viscosity of the ink due to evaporation of water, and the particle diameter of the colorant in the ink are specified. In addition, an inkjet ink composition is disclosed which includes an agglomerating agent, a water-soluble solvent, a surfactant and water, wherein the product of the conductivity and viscosity of the ink is specified, and the surface tension of the water-soluble solvent is also specified. Further, an inkjet ink is disclosed in which a pigment covered with a film forming resin having a carboxyl group is dispersed, wherein the resin-covered pigment has a quaternized carboxyl group on the surface thereof while having a volume average particle diameter of not greater than 0.5 μm.

However, in order to prepare an inkjet ink which has good ejection stability and can produce high quality images having a good combination of image density, visual property, feeling and glossiness, it is necessary to improve these inks.

Further, a pigment dispersion for inkjet inks is disclosed which includes a carbon black, a dispersant and water, wherein the number of coarse particles included in 5 μl of the dispersion is not greater than 1,000,000. It is described therein that an ink using the pigment dispersion can produce high quality images having a good combination of image density evenness, fixability, and preservability.

It is necessary for the ink to further improve the ejection stability in continuous inkjet recording.

For these reasons, the inventors recognized that there is a need for an inkjet ink which has a good combination of ejection stability, preservability and antifoaming property and which can produce high quality images having a good combination of image density, visual property, feeling and glossiness.

BRIEF SUMMARY OF THE INVENTION

As an aspect of the present invention, an inkjet ink is provided which includes at least a carbon black, a surfactant, a polyether-modified silicone oil having a polyoxyalkylene group in a side chain thereof, an anionic self-emulsifying polyether-modified polyurethane resin having a polyoxyalkylene group in a main chain thereof, and water. The inkjet ink contains particles having a particle diameter of not less than 0.5 μm in an amount of from 500,000 to 2,000,000 pieces per 5.0 μl, and has a volume average particle diameter (D50) of from 80 nm to 120 nm and a 90% cumulative particle diameter (D90) of from 160 nm to 200 nm.

As another aspect of the present invention, an ink cartridge is provided which includes a container; and the above-mentioned inkjet ink contained in the container.

As yet another aspect of the present invention, an inkjet recording apparatus is provided which includes the ink cartridge mentioned above, and a recording head to eject the inkjet ink contained in the ink cartridge.

As a further aspect of the present invention, a print is provided which includes a support, and an ink image of the above-mentioned inkjet ink located on the support.

The aforementioned and other aspects, features and advantages will become apparent upon consideration of the following description of the preferred embodiments taken in conjunction with the accompanying drawings.

DETAILED DESCRIPTION OF THE INVENTION

Figure 1:
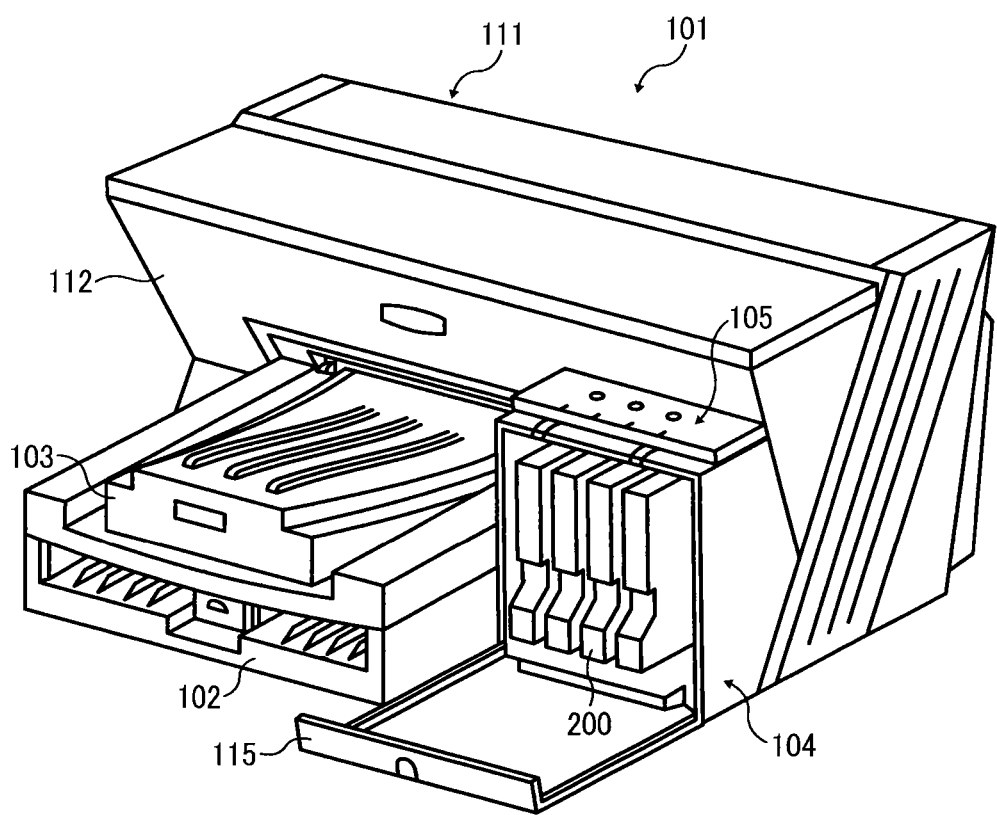
FIG. 1 is a schematic perspective view illustrating an example of the inkjet ink of the present invention.

The inkjet ink of the present invention includes at least a carbon black, a surfactant, a polyether-modified silicone oil having a polyoxyalkylene group in a side chain thereof, an anionic self-emulsifying polyether-modified polyurethane resin having a polyoxyalkylene group in a main chain thereof, and water. The inkjet ink contains particles having a particle diameter of not less than 0.5 mm in an amount of from 500,000 to 2,000,000 pieces per 5.0 μl, and has a volume average particle diameter (D50) of from 80 nm to 120 nm and a 90% cumulative particle diameter (D90) of from 160 nm to 200 nm.

It is difficult for conventional inkjet inks having such particle diameters D50 and D90 as mentioned above to have good ejection property while producing high density images. The present inventors discover that by adding a polyether-modified silicone oil to such an inkjet ink, the resultant ink has good ejection property even when being used for continuous inkjet recording. This is because such a polyether-modified silicone oil can prevent foaming of the inkjet ink.

In the inkjet ink of the present invention, the number of relatively coarse particles having a particle diameter of not less than 0.5 μm is from 500,000 to 2,000,000, preferably from 750,000 to 1,750,000, and more preferably from 1,000,000 to 1,500,000 in 5 μl of the ink. When the number of relatively coarse particles having a particle diameter of not less than 0.5 μm included in 5 μl of the ink is less than 500,000, relatively small particles are present in a large amount. In this case, such small particles tend to aggregate, thereby deteriorating the preservability of the inkjet ink. In contrast, when the number of coarse particles is greater than 2,000,000/5 μl, a nozzle clogging problem in that a nozzle of a recording head is clogged with coarse particles of the ink, thereby forming defective images such as white line omissions) tends to be caused.

The volume average particle diameter (D50, i.e., a 50% cumulative particle diameter) of the inkjet ink of the present invention is from 80 nm to 120 nm, and preferably from 90 nm to 110 nm. When the volume average particle diameter D50 is greater than 120 nm, the ejection stability of the inkjet ink tends to deteriorate. In contrast, when the volume average particle diameter D50 is less than 80 nm, the dispersion stability of the pigment in the inkjet ink tends to deteriorate, thereby deteriorating the ejection stability of the inkjet ink after the ink is preserved.

The 90% cumulative particle diameter (D90) of the inkjet ink is from 160 nm to 200 nm, and preferably from 160 nm to 180 nm. When the 90% cumulative particle diameter (D90) is less than 160 nm, image density of images produced by the inkjet ink tends to decrease, and the dispersion stability of the inkjet ink tends to deteriorate, thereby deteriorating the ejection stability of the inkjet ink after the ink is preserved.

In the present application, the number of coarse particles, the volume average particle diameter D50, and the 90% cumulative particle diameter (D90) of the inkjet ink are determined by the following methods.

(1) Method for Determining the Number of Coarse Particles Having a Particle Diameter of Not Less than 0.5 μm The number of coarse particles is measured by an instrument, ACCUSIZER 708A from PSS under the following conditions.

Data Collection Time: 60 sec
Number Channels: 128
Diluent Flow Rate: 60 ml/min
Target Concentration: 4,000 Part/ml
Number of Samples: 3
Time Between samples: 1 min
Background Threshold: 10 Part/sec (2) Particle Diameters D50 and D90

The particle diameters D50 and D90 are determined from a number particle diameter distribution curve of an ink obtained by an instrument MICROTRACK UPA150 from Nikkiso Co., Ltd. under the following conditions.

Sample to be measured: 0.1% aqueous dispersion

Part Refractive Index: 1.86
Part•Density: 1.86 (g/cm$^3$)
Fluid Refractive Index: 1.33

Next, the constituents of the inkjet ink of the present invention will be described.

The inkjet ink of the present invention includes a polyether-modified silicone oil. Among various polyether-modified silicone oils, silicone oils having a hydrophobic value (defined below) of from 0.40 to 1.5 are preferable. The hydrophobic value of a polyether-modified silicone oil is more preferably from 0.40 to 1.2.

$$\text{Hydrophobic value}=A/B$$

wherein A represents an integral value of $^1$H-NMR spectrum of the polyether-modified silicone oil in a range of from 0 to 0.3 ppm, which spectrum is obtained by using tetramethyl silane (TMS) as a reference; and B represents an integral value of the $^1$H-NMR spectrum in a range of from 3.5 to 4.0 ppm.

In this regard, the integral value in the range of from 0 to 0.3 ppm corresponds to the number of hydrogen atoms of alkyl groups (i.e., hydrophobic portions) connected with the silicon (Si) element of the polyether-modified silicone oil, and the integral value in the range of from 3.5 to 4.0 ppm corresponds to the number of hydrogen atoms of hydrophilic portions such as polyoxyethylene and polyoxypropylene groups connected with the silicon (Si) element of the polyether-modified silicone oil.

The hydrophobic value, which is defined as the ratio (A/B) of the value A corresponding to the number of hydrogen atoms in the hydrophobic portions to the value B corresponding to the number of hydrogen atoms in the hydrophilic portions, is not less than 0.40, the number of the hydrophobic portions in the polyether-modified silicone oil increases, and therefore the polyether-modified silicone oil tends to be easily adsorbed on a water-insoluble resin, thereby making it possible to hydrophilize the surface of the water-insoluble resin, resulting in prevention of an ink fixation problem in that the ink is fixed on an ink-repellent film, which is formed on a recording head and which has a hydrophobic surface. In this regard, the integral values do not include the integral values of the peaks of the reference material, tetramethyl silane (TMS), and the peaks of the spinning side band of tetramethyl silane.

When the hydrophobic value is less than 0.40, adsorption of the polyether-modified silicone oil on a water-insoluble resin is insufficient, and therefore the ink fixation problem tends to be caused. In contrast, when the hydrophobic value is greater than 1.5, the percentage of the hydrophilic portions in the polyether-modified silicone oil decreases, and therefore the hydrophilizing effect is hardly produced (i.e., the effect of preventing occurrence of the ink fixation problem is hardly produced).

The $^1$H-NMR spectrum can be obtained by an instrument, JEOL JNM-A400FT NMR SYSTEM from JEOL Ltd. The measurements are performed under the following conditions.

Solvent used: deuterated chloroform (CDCl$_3$)
Cumulated number: 128
Measurement temperature: room temperature When the sample is not dissolved in the solvent, the solvent may be replaced with another solvent such as DMSO, DMF-d7 (deuterated DMF), (deuterated THF), acetone-d6 (deuterated acetone), methanol-d4 (deuterated methanol), deuterium, or hexane-d14 (deuterated hexane). In this regard, when the solvent is replaced, the solvent is tested in this order, and a solvent capable of dissolving the sample is used. The hydrophobic value is obtained by rounding off the value to two decimal places.

Polyether-modified silicone oils for use in the inkjet ink of the present invention have a structure such that a polyoxyalkylene group such as groups obtained from ethylene oxide and propylene oxide is included in a side chain of a dimethylpolysiloxane. Such polyether-modified silicone oils are marketed. Specific examples of the marketed products of such polyether-modified silicone oils include L-7604 from Dow Corning Toray Silicone Co., Ltd., and KF-353 from Shin-Etsu Chemical Co., Ltd.

The content of such a polyether-modified silicone oil in the inkjet ink is preferably from 0.01% to 3% by weight, and more preferably from 0.1% to 1% by weight.

The inkjet ink of the present invention includes a polyether-modified silicone oil as an essential component. When such a polyether-modified silicone oil is not included in an ink (such as the ink of Comparative Example 8 mentioned below), the ink cannot have the above-mentioned physical properties.

Next, another constituent of the inkjet ink of the present invention, anionic self-emulsifying polyether-modified polyurethane resin, will be described.

The polyurethane resin for use in the inkjet ink of the present invention means a polymer having a polyurethane skeleton, in which urethane bonds are connected, in a main chain. Among various polyurethane resins, anionic self-emulsifying polyether-modified polyurethane resins are used for the toner of the present invention. Since such anionic self-emulsifying polyether-modified polyurethane resins have a hydrophilic group in the main chain, the anionic self-emulsifying polyether-modified polyurethane resins have water dispersibility. When an anionic self-emulsifying polyurethane resin other than such anionic self-emulsifying polyether-modified polyurethane resins (e.g., polycarbonate polyurethane resin used for Comparative Example 7 below) is used, the ink cannot have the above-mentioned physical properties.

Such anionic self-emulsifying polyether-modified polyurethane resins can be prepared by reacting a diisocyanate compound, a polyetherdiol compound, and a diol having an acid group such as carboxylic acid group and sulfonic acid group.

Specific examples of such a diisocyanate compound include aliphatic diisocyanate compounds such as hexamethylene diisocyanate, and 2,2,4-trimethylhexamethylene diisocyanate; alicyclic diisocyanate compounds such as isophoron diisocyanate, hydrogenated xylylene diisocyanate, 1,4-cyclohexane diisocyanate, and 4,4'-dicyclohexylmethane diisocyanate; aromatic aliphatic diisocyanate compounds such as xylylene diisocyanate, and tetramethylxylene diisocyanate; aromatic diisocyanate compounds such as toluoylene diisocyanate, and phenylmethane diisocyanate; and modified diisocyanates prepared by modifying the above-mentioned diisocyanate compounds so as to include a carbodiimide group, a uretdione group, or a uretonimine group.

Specific examples of such a polyetherdiol compound include polyethylene glycol, polypropylene glycol, polytetramethylene ether glycol, and polyhexamethylene ether glycol. By using such a polyetherdiol compound, the polyurethane resin hardly causes degeneration caused by hydrolysis in water, and therefore the ink can have good preservation stability.

Specific examples of such a diols having an acid group include dimethylol acetic acid, dimethylol butanoic acid, dimethylol propionic acid, and dimethylol butyric acid. Among these diols, dimethylol butanoic acid is preferable.

Specific examples of the method for preparing such a polyurethane resin include a solution method including synthesizing a prepolymer having an isocyanate group at the end thereof in a solvent, which has a low boiling point and which is not reactable with an isocyanate group, incorporating a hydrophilic group using a polyol, diluting the reaction product with water to perform phase change, and then distilling the solvent away to prepare a polyurethane dispersion; and a prepolymer method, but are not limited thereto.

When such a polyurethane resin is synthesized using the prepolymer method, a low-molecular weight polyhydroxy compound may be used. Specific examples of such a low-molecular weight polyhydroxy compound include diols mentioned above for use as polyether diols, lower molar alkylene oxide adducts of such diols, trihydric alcohols such as glycerin, trimethylol ethane and trimethylol propane, and lower molar alkylene oxide adducts of such trihydric alcohols.

Such polyurethane resins can be used in a form of metal salt such as Li, Na, and K, or organic amine salt such as ammonia, dimethylamine, and (mono-, di- or tri-) ethanolamine. These resins can be prepared by neutralizing polyurethanes prepared by the above-mentioned method.

A proper base is used for the neutralization reaction so that a desirable counter ion is formed. Specific examples of the base used for neutralizing polyurethanes include alkyl amines such as butylamine and triethylamine, alkanol amines such as monoethanolamine, diethanolamine, and triethanolamine, morpholine, and inorganic bases such as ammonia and sodium hydroxide.

Specific examples of marketed polyurethane emulsions for use in the inkjet ink of the present invention include SF110 from Dai-ichi Kogyo Seiyaku Co., Ltd.; and W-5025, W-5661 and W-6020 from Mitsui Chemicals Inc.

The anionic self-emulsifying polyether-modified polyurethane resin included in the inkjet ink of the present invention preferably has an acid value of from 40 to 100 mgKOH/g.

Next, carbon black included in the inkjet ink of the present invention will be described.

Carbon black included in the inkjet ink preferably has a BET specific surface area of from 100 to 400 $m^2/g$, and more preferably from 100 to 300 $m^2/g$.

In addition, carbon black prepared by using a high structure pigment can produce images having a higher optical density, and gas black has higher structure than furnace black. Carbon black having a BET specific surface area of less than 100 $m^2/g$ tends to have low structure. In contrast, carbon black having a BET specific surface area of greater than 400 $m^2/g$ tends to increase the viscosity of the resultant inkjet ink because the amount of a surfactant used for dispersing the carbon black increases. The BET specific surface area of carbon black can be measured by a BET method in which nitrogen is adsorbed on the surface of the carbon black. By changing the burning conditions, the BET specific surface area of the resultant carbon black can be adjusted.

Specific examples of marketed carbon blacks for use in the inkjet ink of the present invention include #10B, #20B, #30, #40, #44, #45, #45L, #50, #55, #95, #260, #900, #1000, #2200B, #2300, #2350, #2400B, #2650, #2700, #4000B, CF9, MA8, MA11, MA77, MA100, MA220, MA230, MA600 and MCF88 from Mitsubishi Chemical Corp.; MONARCHs 120, 700, 800, 880, 1000, 1100, 1300 and 1400, MOGAL L, and REGALs 99R, 250, 300R, 330R, 400R, 500 and 660R from Cabot Corp.; and PRINTEXs A, G, U, V, 55, 140U and 140V, SPECIAL BLACKs 4, 4A, 5, 6, 100 and 250, and COLOR BLACKs FW1, FW2, FW2V, FW18, FW200, S150, S160 and S170 from Degussa AG.

The inkjet ink of the present invention includes a surfactant as a dispersant.

A proper surfactant is selected depending on the carbon black used. Specific examples of anionic surfactants for use in the inkjet ink include alkylsulfonic acid salts, alkylbenzenesulfonic acid salts, alkylnaphthalenesulfonic acid salts, formalin condensates of sodium naphthalenesulfonate, alkane or olefinsulfonic acid salts, alkylsulfuric acid esters, polyoxyethylenealkyl(or alkylaryl)ethersulfuric acid esters, alkylphosphoric acid salts, alkyldiphenyletherdisulfonic acid salts, ethercarboxylate, alkylsulfosuccinic acid salts, α-sulfoaliphatic acid esters, fatty acid salts, condensation products of a higher fatty acid and an aminoacid, and naphthenic acid salts. Among these surfactants, aromatic sulfonic acid salts such as formalin condensates of sodium naphthalenesulfonate are preferable.

The aromatic sulfonic acid salts mentioned above are aromatic compounds having a sulfonic acid group, which are neutralized with a basic compound. Specific examples of the aromatic compounds having a sulfonic acid group include benzene sulfonic acid, p-toluenesulfonic acid, naphthalenesulfonic acid, and alkylnaphthalenesulfonic acid, and specific examples of the basic compound include alkylamines such as butylamine and triethylamine; alkanolamines such as monoethanolamine, diethanolamine, triethanolamine, and triisopropanolamine; and other basic compounds such as morpholine, ammonia water, sodium hydroxide, lithium hydroxide, potassium hydroxide, aminomethylpropanediol, ammethylpropanediol, and choline, In addition, buffers such as trishydroxymethylaminomethane and good buffer can also be used as the basic compound.

Further, salts of formalin condensates of an aromatic sulfonic acid can also be used as aromatic sulfonic acid salts.

Sodium salts of formalin condensates of naphthalenesulfonic acid are sodium salts of condensates of naphthalenesulfonic acid and formaldehyde, and are not particularly limited as long as the condensates include the condensation unit as a repeat unit.

Sodium salts of formalin condensates of naphthalenesulfonic acid for use in the inkjet ink preferably have a structure such that the formalin condensates of naphthalenesulfonic acid include a dimer, a trimer and a tetramer of naphthalenesulfonic acid in a total amount of from 20% to 80% by weight based on the total weight of the formalin condensates. When the total amount is less than 20% by weight, it becomes difficult to disperse a pigment in the pigment dispersion and the inkjet ink, thereby often causing the nozzle clogging problem. In contrast, when the total amount is greater than 80% by weight, the pigment dispersion and the inkjet ink tends to have high viscosity, thereby making it difficult to disperse a pigment. The method for preparing a sodium salt of formalin condensate of naphthalenesulfoninc acid is described in detail in JP-2006-233210-A. The total amount of a dimer, a trimer and a tetramer can be measured by gas chromatography. Specifically, the method includes a condensation reaction step of subjecting naphthalenesulfonic acid and formaldehyde to a condensation reaction; a step of adding a sulfurous acid salt to the condensation reaction product including the condensate; and a step of removing water-insoluble materials from the reaction product. By properly controlling the condensation reaction, the total amount of a dimer, a trimer and a tetramer can be controlled.

The content of a surfactant in the inkjet ink is preferably from 0.01 to 0.5 parts by weight, and more preferably from 0.1 to 0.4 parts by weight, based on 1 part of the pigment included in the inkjet ink so that the pigment dispersed in the inkjet ink has a relatively small average particle diameter. When the content is less than 0.01 parts by weight, it becomes difficult to satisfactorily disperse a pigment. In contrast, when the content is greater than 0.5 parts by weight, the viscosity of the resultant inkjet ink tends to excessively increase, thereby making it difficult to satisfactorily perform inkjet recording.

The inkjet ink of the present invention preferably includes a wetting agent, and preferably a wetting agent having a boiling point of not lower than 180° C. When a wetting agent is included in the inkjet ink, the water containing property and wetting property of the ink can be enhanced, and therefore occurrence of problems such that a pigment (carbon black) in the ink agglutinates and the viscosity of the ink increases when the ink is preserved for a long period of time can be prevented, namely the inkjet ink has good preservation stability. In addition, even when the ink is allowed to settle in a tip of a nozzle while exposed to air, the ink can maintain good fluidity for a long period of time. Further, the inkjet ink hardly causes the nozzle clogging problem in a printing operation or when a printing operation is started after a long pause, namely the inkjet ink has good ejection stability.

Specific examples of such a wetting agent include polyalcohols such as ethylene glycol, diethylene glycol, 3-methyl-1,3-butylene glycol, 1,3-butylene glycol, triethylene glycol, polyethylene glycol, 1,5-pentanediol, 1,6-hexanediol, glycerin, 1,2,6-hexanetriol, 2-ethyl-1,3-hexanediol, 1,2,4-butanetriol, 1,2,3-butanetriol, and petriol; polyalcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyalcohol aryl ethers such as ethylene glycol monophenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, $\epsilon$-caprolactam, and $\gamma$-butyrolactone; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethylsulfoxide, sulfolane, and thiodiethanol; propylene carbonate, and ethylene carbonate. These wetting agents can be used alone or in combination.

Among these wetting agents, 3-methyl-1,3-butylene glycol, 1,3-butylene glycol, diethylene glycol, triethylene glycol, and glycerin are preferable because occurrence of the nozzle clogging problem in that a nozzle is clogged with the ink due to drying of the ink (i.e., occurrence of defective ejection of ink caused by evaporation of water in the ink) can be prevented, and images having good image quality can be recorded.

The inkjet ink of the present invention optionally includes a penetrant. Specific examples thereof include polyoxyethylenealkylethers, polyoxyethylenealkylphenylethers, polyoxyethyleneglycol esters, polyoxyethylene/polyoxypropylenedecylethers, and nonionic surfactants such as acetylene based surfactants, silicone based surfactants, and fluorine-containing surfactants.

Specific examples of marketed products of the nonionic surfactants mentioned above include BT Series from Nikko Chemicals Co., Ltd., NONIPOL Series from Sanyo Chemical Industries Ltd., D- or P-Series from Takemoto Oil & Fats Co., Ltd., SURFYNOL Series from Air Products and Chemicals Inc., OLFINE Series from Nissin Chemical Co., Ltd., EMALEX DAPE Series from Nihon-Emulsion Co., Ltd., Silicone surfactants from Dow Corning Tray Silicone Co., Ltd., and fluorine-containing surfactants from Neos Co., Ltd., Sumitomo 3M Ltd., Dupont, and Daikin Industries Ltd.).

The inkjet ink of the present invention optionally includes a defoamer. Known defoamers such as silicone defoamers, polyether defoamers, and fatty acid defoamers can be used alone or in combination. Among these defoamers, silicone defoamers are preferable because of having good bubble destroying property. Silicone defoamers are classified into oil type defoamers, compound type defoamers, emulsion type defoamers, and self-emulsifying type defoamers.

The above-mentioned compound type silicone defoamers are oil type defoamers in which a particulate material such as silica and alumina is dispersed to enhance the defoaming ability.

The above-mentioned emulsion type silicone defoamers are O/W emulsions of compound type silicone defoamers prepared by using an emulsifier to enhance the dispersibility in water.

The above-mentioned self-emulsifying type silicone defoamers include a silicone oil and a silica, and can easily become O/W emulsions when being diluted by water.

When a fluorine-containing surfactant is used for the inkjet ink of the present invention, the ink tends to foam because the surface tension of the ink decreases while easily causing a fixation problem in that the ink is dried and fixed to a water-repellent film on an inkjet recording head. In order to prevent occurrence of such foaming and fixation problems, it is preferable to use an oil type silicone defoamer for such an ink. Oil type silicone defoamers have advantages such that since the defoamers include no particulate material (such as silica), the defoaming ability is not deteriorated even when the ink including the defoamer is filtered because no material is removed therefrom by the filtering operation; the resultant ink has good handling performance in the ink preparation process, and therefore it is easy to scale up production of the ink.

Next, the physical property of the inkjet ink of the present invention will be described. The inkjet ink preferably has a viscosity of from 6.0 to 10.0 mPa·s, and more preferably from 7.0 to 9.0 mPa·s. When the viscosity is greater than 10.0 mPa·s, defective ink ejection is often caused. In contrast, when the viscosity is less than 6.0 mPa·s, the image density (optical density) of images recorded by the ink often decreases because the ink excessively penetrates into recording media such as papers, and the pigment included in the ink enters into the inside of the recording medium. In this application, the viscosity is measured under environmental conditions of 23° C. and 55% RH using a viscometer TVE-20L from Toki Sangyo Co., Ltd.

In order to control the viscosity of the ink, for example, a method is used in which the added amount of such a wetting agent as mentioned above is adjusted while balancing the viscosity and other properties such as ejection property and drying property of the ink, and the image qualities of images produced by the ink.

Next, the method for preparing the inkjet ink of the present invention will be described. Any known inkjet ink preparation methods can be used for preparing the inkjet ink of the present invention. For example, the following method can be used.

Initially a pigment dispersion is prepared by a method including premixing an ink component mixture, which includes at least a carbon black, a surfactant, and water, and optionally includes other components such as a water-soluble organic solvent, using an agitator (such as agitators having a blade), a homogenizer, or a bead-less mill; and then dispersing the premixed ink components using a dispersing device such as sand mills, ball mills, DYNO MILL, roll mills, NANOMIZER and homogenizers to prepare a pigment dispersion. When a polyurethane resin is used for the ink, it is preferable to mix ink components other than the polyurethane resin, followed by mixing the polyurethane resin with the mixture. This is because when a polyurethane resin is initially mixed with other ink components, a problem such that the ink components agglutinate or the ink has a high viscosity is often caused.

Next, the pigment dispersion is mixed with other ink components. In this regard, both a method in which other ink components are added to the pigment dispersion, and a method in which the pigment dispersion is added to other ink components can be used. However, the following method is preferably used because problems such as formation of coarse pigment particles and increase in particle diameter of a pigment, which are caused by agglutination in mixing of ink components, can be avoided.

For example, ink components having no particle diameter such as a first water-soluble organic solvent (glycerin), a second water-soluble organic solvent (1,3-butanediol), 2-ethyl-1,3-hexanediol, polyoxyethylene (3 mole)alkyl(C13) etheracetic acid sodium salt, 2-pyrolidone, a polyether-modified silicone oil, and water are added in this order to prepare a vehicle (A), wherein the mixing operations are performed for 30 minutes in total. Next, the pigment dispersion prepared above, and ink components having a particle diameter such as a polyurethane resin are mixed in this order to prepare a colorant liquid (B), wherein the mixing operation is performed for 30 minutes in total. The colorant liquid (B) thus prepared is added to the vehicle (A) while agitating, and the mixture is agitated for 1 hour to prepare an inkjet ink.

In this regard, the pigment dispersion and/or the inkjet ink are preferably subjected to a filtering treatment using a filter or a centrifugal treatment using a centrifugal separator to remove coarse particles from the pigment dispersion and/or the inkjet ink so that the resultant inkjet ink has god ejection stability.

Next, the ink cartridge of the present invention will be described.

The ink cartridge of the present invention includes the inkjet ink of the present invention, and a container containing the inkjet ink therein, and optionally includes other members if necessary.

The shape, structure, dimension and constitutional materials of the container are not particularly limited, and are properly determined. For example, ink bags made of an aluminum-laminated film, or a resin film can be preferably used.

The ink cartridge will be described by reference to FIGS. 4 and 5.

Figure 4:
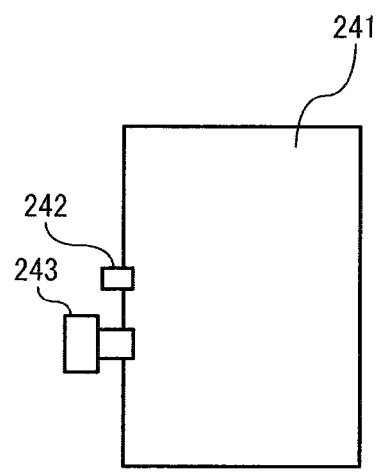
FIG. 4 is a schematic view illustrating an ink bag for use in the ink cartridge of the present invention.
Figure 5:
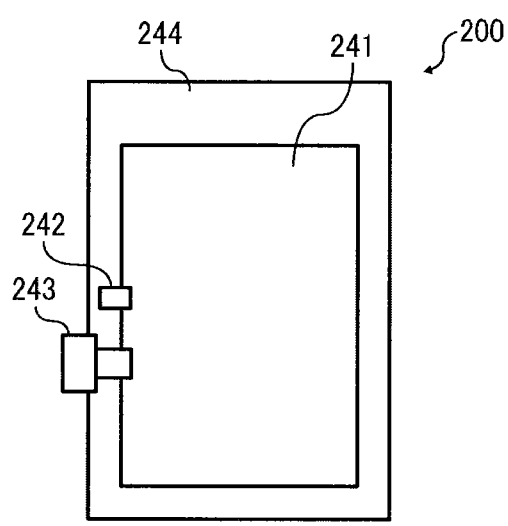
FIG. 5 is a schematic view illustrating an example of the ink cartridge of the present invention.

FIG. 4 illustrates an ink bag 241, which is an example of the ink container of the ink cartridge of the present invention, and FIG. 5 illustrates an ink cartridge 200, which is an example of the ink cartridge of the present invention and which includes therein the ink bag 241 illustrated in FIG. 4.

As illustrated in FIG. 4, the inkjet ink of the present invention is fed into the ink bag 241 from an ink inlet 242. After discharging air from the ink bag 241, the ink inlet 242 is closed by welding or the like. When the ink cartridge 240 is used, the ink bag 241 is set in an inkjet printer so that a needle of the inkjet printer is inserted into an ink outlet 243 of the ink bag 241. The ink bag 241 is typically made of a material having low permeability to gas such as wrapping materials (e.g., aluminum-laminated films). The ink bag 241 is contained in a cartridge case 244 typically made of a plastic. The resultant ink cartridge 200 is typically used by being detachably attached to various image forming apparatuses.

The ink cartridge 200 of the present invention is more preferably detachably attached to inkjet recording apparatuses.

Next, the inkjet recording apparatus of the present invention will be described.

The inkjet ink of the present invention can be used for inkjet printers, inkjet facsimile devices, inkjet copiers, inkjet multifunction products having two or more of printing, facsimileing and copying functions. In this regard, the ink cartridge of the present invention is preferably attached to the inkjet recording apparatus.

Next, the inkjet recording apparatus of the present invention will be described by reference to an example, which is illustrated in FIG. 1 and which is used for evaluating the inks of Examples and Comparative Examples mentioned below.

The inkjet recording apparatus illustrated in FIG. 1 includes a main body 101 thereof, a recording sheet feed tray 102, which is attached to the main body 101 and on which a stack of recording sheets is set, a copy tray 103, which is attached to the main body 101 and on which recording sheets bearing ink images thereon are stacked, and an ink cartridge setting portion 104 to which ink cartridges 200 are detachably attached. On the upper surface of the ink cartridge setting portion 104, an operating portion 105 including operation keys, a display, etc. is arranged. The ink cartridge setting portion 104 has a front cover 115 which is openable and closable so that the ink cartridges 200 can be attached to the ink cartridge setting portion 104 or detached therefrom. Numerals 111 and 112 respectively denote an upper cover of the inkjet recording apparatus, and a front cover of the apparatus.

Figure 2:
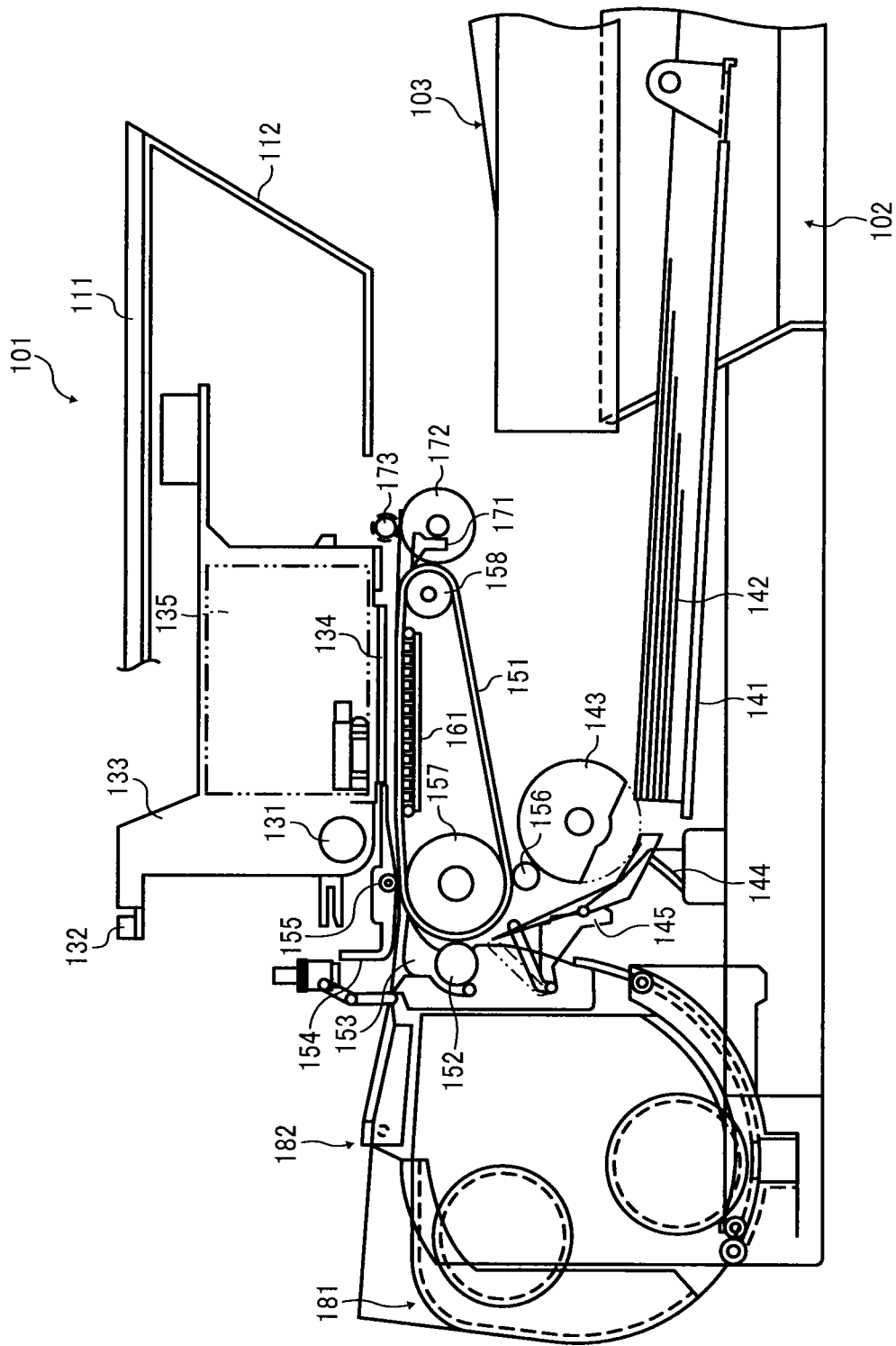
FIG. 2 is a schematic cross-sectional view illustrating the inkjet ink illustrated in FIG. 1.
Figure 3:
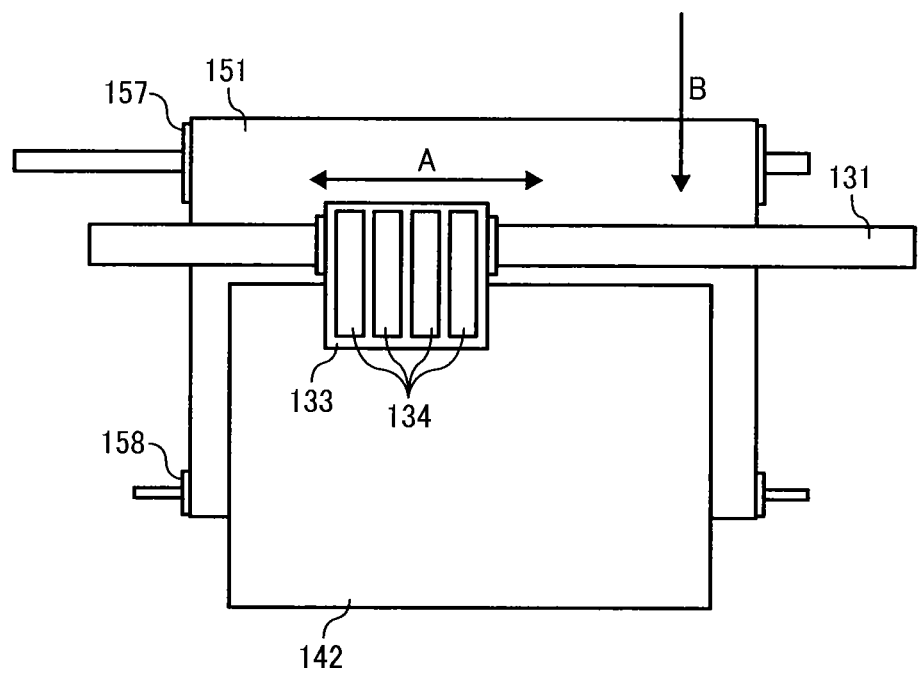
FIG. 3 is a partial enlarged plan view illustrating the inkjet recording head of the inkjet recording apparatus illustrated in FIG. 1.

As illustrated in FIGS. 2 and 3, a carriage 133 is slidably supported by a guide rod 131 and a stay 132, which are supported by both side plates (not shown) of the main body 101, so that the carriage 133 is moved in a main scanning direction (A) by a main scanning motor (not shown) to perform a scanning operation (i.e., an image forming operation).

An inkjet recording head 134 including four inkjet recording heads, each of which has multiple nozzles arranged in a direction perpendicular to the main scanning direction (A) to eject droplets of yellow (Y), magenta (M), cyan (C) or black (K) inkjet ink downward, is provided on the carriage 133.

Each of the four inkjet recording heads 134 includes an energy generator to eject ink droplets. Specific examples of the energy generator include, but are not limited thereto, piezoelectric actuators (e.g., piezoelectric devices), thermal actuators to eject ink droplets utilizing phase change of ink by boiling a liquid film using an electrothermal device such as a resistor, shape memory alloy actuators utilizing phase change of metal caused by temperature change, and electrostatic actuators utilizing electrostatic force.

In addition, sub-tanks 135 containing the color inkjet inks to supply the color inkjet inks to the respective recording heads 134 are provided on the carriage 133. The color inkjet inks in the ink cartridges 200 set to the ink cartridge setting portion 104 are supplied to the respective sub-tanks 135 via respective ink supplying tubes (not shown).

The inkjet recording apparatus includes a recording sheet supplier to feed recording sheets 142 set on a sheet loading portion (pressing plate) 141. The recording sheet supplier includes a sheet feeding roller 143 to feed the recording sheets 142, and a separation pad 144, which faces the sheet feeding roller 143 while being biased toward the sheet feeding roller 143 and which is made of a material having a high friction coefficient, to feed the recording sheets 142 one by one from the sheet loading portion 141.

The inkjet recording apparatus further includes a feeder to feed the recording sheet 142, which is fed from the recording sheet supplier, toward the image recording area located below the inkjet recording head 134. The feeder includes a feeding belt 151 to feed the recording sheet 142 while electrostatically attracting the recording sheet, a counter roller 152 to feed the recording sheet 142, which is fed from the recording sheet supplier along a guide 145, while sandwiching the recording sheet 142 with the feeding belt 151, a direction changing guide 153 to change the direction of the recording sheet 142, which is fed substantially vertically, at an angle of about 90° so that the recording sheet 142 is contacted with the feeding belt 151 so as to be fed thereby, a pressing roller 155 which is biased toward the feeding belt 151 by a pressing member 154, and a charging roller 156 to charge the surface of the feeding belt 151.

The feeding belt 151 is an endless belt, which is tightly stretched by a feeding roller 157 and a tension roller 158 so as to be rotated in a recording sheet feeding direction (i.e., a sub-scanning direction (B)) perpendicular to the main scanning direction (A). For example, the feeding belt 151 includes a first layer (i.e., an uppermost layer), which electrostatically attracts the recording sheet 142 and which is made of a resin layer (such as a tetrafluoroethylene—ethylene copolymer (ETFE) whose electric resistance is not controlled) with a thickness of about 40 μm, and a second layer (i.e., a medium resistance layer or a grounding layer), which is made of almost the same material as that of the first layer except that carbon black is included therein so that the second layer has a medium electric resistance.

In addition, a guide member 161 is arranged below the feeding belt 151 so as to face the image recording area in which an image is recorded on the recording sheet 142 by the inkjet recording head 134.

The inkjet recording apparatus further includes a sheet discharger to discharge the recording sheet 142, which bears an image recorded by the inkjet recording head 134, from the main body 101. The sheet discharger includes a separation pick 171 to separate the recording sheet 142 from the feeding belt 151, and discharging rollers 172 and 173 to discharge the recording sheet 142 toward the copy tray 103 located below the discharging roller 172.

A duplex copy unit 181 is detachably attached to the backside of the main body 101 of the inkjet recording apparatus. The duplex copy unit 181 receives the recording sheet 142, which is fed to the duplex copy unit 181 by reversely rotating the feeding belt 151, and feeds again the recording sheet 142 to the nip between the counter roller 152 and the feeding belt 151 so that another image is formed on the backside of the recording sheet 142 by the inkjet recording heads 134 in the image recording area.

A manual sheet feeder 182, by which a recording sheet can be manually fed to the inkjet recording apparatus, is provided above the duplex copy unit 181.

Next, the image forming operation of the inkjet recording apparatus will be described.

The recording sheet 142 is supplied one by one by the recording material supplier. The recording sheet 142 thus fed in substantially the vertical direction is guided by the guide 145 to the nip between the feeding belt 151 and the counter roller 152 so as to be fed by the feeding belt 151 and the counter roller 152. The recording sheet 142 is guided by the direction changing guide 153 so that the direction of the sheet is changed at an angle of about 90°. The recording sheet 142 is then fed by the feeding belt 151 while pressed toward the feeding belt 151 by the pressing roller 155.

In this regard, since the feeding belt 151 is charged by the charging roller 156, the recording sheet 142 is fed by the feeding belt 151 while electrostatically adhered thereto. Next, the carriage 133 is moved in the main scanning direction (A) while the inkjet recording head 134 is driven according to image signals so as to eject droplets of the color inkjet inks to form one line image on the surface of the recording sheet 142, which is stopped in the image forming operation. After recording one line image, the recording sheet 142 is fed in a predetermined length in the sub-scanning direction (B), and the next image forming operation is performed to form another one line image on the surface of the recording material sheet 142. By repeating the image forming operation, an image is formed on the surface of the recording material sheet 142. When the inkjet recording apparatus receives a signal such that the image recording operation is completed or the rear edge of the recording sheet 142 reaches the image recording area, the inkjet recording apparatus stops the image forming operation, and the sheet discharger discharges the recording sheet 142 bearing the image thereon to the copy tray 103.

When it is detected that the inkjet ink in the sub tank 135 is substantially exhausted (i.e., near-end of ink is detected), a predetermined amount of ink is supplied to the sub tank 135 from the corresponding ink cartridge 200.

When the inkjet ink in the ink cartridge 200 is exhausted, it is possible that after the ink cartridge is disassembled, the ink bag in the ink cartridge is replaced with a new ink bag, and then the ink cartridge 200 is assembled again to be attached to the inkjet recording apparatus 100. Even when the ink cartridge 200 is set so as to be vertical from a front side of the inkjet recording apparatus as illustrated in FIG. 1, the ink in the ink cartridge 200 can be stably supplied to the corresponding sub tank 135. Therefore, even when the ink cartridge cannot be set from the upper side of the main body 101 of the inkjet recording apparatus due to space limitation (for example, in a case where the apparatus is set in a rack or an object is set on the upper surface of the apparatus), the ink cartridge 200 can be easily replaced.

Hereinbefore, the inkjet recording apparatus of the present invention has been described by reference to a serial (shuttle-type) inkjet recording apparatus in which a carriage is scanned in the main scanning direction (A). However, the inkjet recording apparatus of the present invention is not limited thereto, and may be used as a line inkjet recording apparatus using a line-type inkjet recording head.

Next, the print formed using the inkjet ink of the present invention will be described.

The inkjet ink of the present invention can form an image (a print) on a recording medium having an ink absorbing property such as papers, and a recording medium having substantially no ink absorbing property. Specific examples of the recording medium include plastic sheets made of a plastic such as polyethylene terephthalate, polycarbonate, polypropylene, polyethylene, polysulfone, ABS resins, and polyvinylidene chloride; surfaces of metals such as brass, iron, aluminum, SUS, and copper; surfaces of media on which a metal such as the above-mentioned metals is coated by evaporation or the like method; media which include a substrate such as papers and which are optionally subjected to a water-repellent treatment; and surfaces of ceramics.

Among these recording media, papers are preferable because papers have low costs and images recorded thereon have naturalness.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Carbon blacks, surfactants, silicone oils and polyurethane resins used for preparing the below-mentioned inkjet inks of Examples and Comparative Examples are listed in Tables 1 to 4. In this regard, carbon blacks p to z are prototypes and were prepared by changing the preparation conditions of a carbon black a to change the BET specific surface area. In addition, surfactants II to V are also prototypes and were prepared by changing the polymerization degree of a surfactant I.

Further, formulation and physical properties of the inkjet inks are described in Tables 5-1-1 to 5-3-3, and the evaluation results of the inks are described in Table 6.

TABLE 1

| Carbon black | Color Index | Trade name | Manufacturer | Type | BET specific surface area ($m^2/g$) |
|---|---|---|---|---|---|
| α | Pigment Black 7 | NIPEX 150 | Degussa AG | Gas black | 110 |
| β | Pigment Black 7 | (prototype) | Degussa AG | Gas black | 100 |
| γ | Pigment Black 7 | (prototype) | Degussa AG | Gas black | 400 |
| δ | Pigment Black 7 | (prototype) | Degussa AG | Gas black | 90 |
| ε | Pigment Black 7 | (prototype) | Degussa AG | Gas black | 410 |
| ζ | Pigment Black 7 | NIPEX 90 | Degussa AG | Furnace black | 300 |

TABLE 2

| Surfactant (Dispersant) | Constituent | Trade name | Manufacturer | Total amount of dimer, trimer and tetramer of naphthalenesulfonic acid (% by weight) |
|---|---|---|---|---|
| I | Sodium salt of formalin condensate of naphthalenesulfonic acid | A-45-PN | Takemoto Oil & Fats Co., Ltd. | 50 |
| II | Sodium salt of formalin condensate of naphthalenesulfonic acid | (Prototype) | Takemoto Oil & Fats Co., Ltd. | 20 |
| III | Sodium salt of formalin condensate of naphthalenesulfonic acid | (Prototype) | Takemoto Oil & Fats Co., Ltd. | 80 |
| IV | Sodium salt of formalin condensate of naphthalenesulfonic acid | (Prototype) | Takemoto Oil & Fats Co., Ltd. | 19 |
| V | Sodium salt of formalin condensate of naphthalenesulfonic acid | (Prototype) | Takemoto Oil & Fats Co., Ltd. | 81 |
| VI | Water-soluble styrene acrylic resin | HPD-96 | BASF | — |

TABLE 3

| Silicone oil | Constituent | Trade name | Manufacturer |
|---|---|---|---|
| A | Polyether-modified silicone oil | FZ-2203 | Nippon Unicar Co., Ltd. |
| B | Polyether-modified silicone emulsion | KM-72F | Shin-Etsu Chemical Co., Ltd. |
| C | Amino-modified silicone oil | SF8417 | Nippon Unicar Co., Ltd. |

TABLE 4

| Polyurethane resin | Constituent | Trade name | Manufacturer | Structure |
|---|---|---|---|---|
| a | Polyurethane resin | XW-75-W920 | Mitsui Chemicals, Inc. | Anionic self-emulsifying polyether-modified polyurethane |
| b | Polyurethane resin | SF460S | Dai-ichi Kogyo Seiyaku Co., Ltd. | Anionic self-emulsifying polycarbonate-modified polyurethane |

Example 1

1. Preparation of Carbon Black Dispersion
The following components were mixed to prepare a premix (i.e., a slurry).

| | |
|---|---|
| Carbon black α | 150 parts |
| Surfactant I (dispersant) | 10 parts |
| (Weight ratio of dispersant to carbon black was 0.07 (i.e., 10/150)) | |
| High purity water | 840 parts |

The premix was subjected to media milling under the following conditions.
Mill used: Disc mill (UAM type mill from Kotobuki Industries Co., Ltd.)
Bead used for the mill: Zirconia bead with a diameter of 0.03 mm
Filling rate of bead: 70%
Peripheral speed of disc: 6 m/s
Temperature of liquid to be dispersed: 10° C.
Dispersing time (retention time): 20 minutes
The dispersed mixture was then centrifuged under the following conditions to remove coarse particles therefrom.
Centrifugal separator used: MODEL 7700 from Kubota Corp.
Acceleration of gravity: 8000G
Centrifugal treatment time: 20 minutes
The centrifuged mixture was filtered with a filer having a pore diameter of 1.2 μm. Thus, a carbon black dispersion was prepared.

2. Preparation of Ink
The following components were mixed and the mixture was agitated for 30 minutes to prepare a vehicle (A).

| | |
|---|---|
| Glycerin (first water-soluble organic solvent) | 20.0 parts |
| 1,3-Butanediol (second water-soluble organic solvent) | 10.0 parts |
| 2-Ethyl-1,3-hexanediol | 3.0 parts |
| Polyoxyethylene(3mole)alkyl(C13)ether acetic acid sodium salt | 0.5 parts |
| 2-Pyrrolidone | 3.0 parts |
| Polyether-modified silicone oil A | 0.02 parts |
| High purity water | 28.49 parts |

-continued

The following components were mixed and the mixture was agitated for 30 minutes to prepare a colorant (B).

| | |
|---|---|
| Carbon black dispersion prepared above | 33.33 parts |
| Polyurethane resin (a) | 2.0 parts |

The colorant (B) was added to the vehicle (A), and the mixture was agitated for 1 hour. The mixture was filtered using a membrane filter having a pore diameter of 0.8 μm, followed by vacuum deaeration to prepare an inkjet ink of Example 1. Hereinafter, this ink preparation method is referred to as the ink preparation method 1.

Examples 2 to 25 and Comparative Examples 1 to 9

The procedure for preparation of the ink of Example 1 was repeated except that the formulation of the inkjet inks and the ink preparation conditions were changed as described in Tables 5-1-1 to 5-3-3 to prepare inkjet inks of Examples 2 to 25 and Comparative Examples 1 to 9.

Comparative Example 10

The procedure for preparation of the inkjet ink of Example 1 was repeated except that the ink preparation method was changed to the following ink preparation method 2.

The following components were mixed and the mixture was agitated for 30 minutes to prepare a vehicle (C).

| | |
|---|---|
| Glycerin (first water-soluble organic solvent) | 20.0 parts |
| 1,3-Butanediol (second water-soluble organic solvent) | 10.0 parts |
| 2-Ethyl-1,3-hexanediol | 3.0 parts |
| Polyoxyethylene(3mole)alkyl(C13)ether acetic acid sodium salt | 0.5 parts |
| 2-Pyrrolidone | 3.0 parts |
| Polyether-modified silicone oil A | 0.02 parts |
| Polyurethane resin (a) | 2.0 parts |
| High purity water | 28.49 parts |

Next, 33.33 parts of the carbon black dispersion prepared above was added to the vehicle (C) and the mixture was agitated for 1 hour. The mixture was filtered using a membrane filter having a pore diameter of 0.8 μm, followed by vacuum deaeration to prepare an inkjet ink of Comparative Example 10.

The formulation of the inkjet inks and the preparation conditions are described in Tables 5-1-1 to 5-3-3 below.

TABLE 5-1-1

| | Carbon dispersion | | | | |
|---|---|---|---|---|---|
| | Carbon (BET specific surface area ($m^2/g$)) | Surfactant | Weight ratio of surfactant | Dispersing time (minutes) | Acceleration of gravity, and centrifugal treatment time (min) |
| Example 1 | α (gas black) (110) | I | 0.07 | 20 | 8000 20 |
| Example 2 | α (gas black) (110) | I | 0.07 | 20 | 10000 35 |
| Example 3 | α (gas black) (110) | I | 0.07 | 20 | 4000 15 |
| Example 4 | α (gas black) (110) | I | 0.07 | 30 | 8000 20 |
| Example 5 | α (gas black) (110) | I | 0.07 | 15 | 8000 20 |
| Example 6 | α (gas black) (110) | I | 0.07 | 30 | 8000 25 |
| Example 7 | α (gas black) (110) | I | 0.07 | 15 | 8000 18 |
| Example 8 | β (gas black) (100) | I | 0.07 | 8 | 8000 20 |
| Example 9 | γ (gas black) (400) | I | 0.07 | 40 | 8000 20 |
| Example 10 | δ (gas black) (90) | I | 0.07 | 7 | 8000 20 |
| Example 11 | ε (gas black) (410) | I | 0.07 | 35 | 8000 20 |
| Example 12 | ζ (furnace black) (300) | I | 0.07 | 35 | 10000 35 |

TABLE 5-1-2

| | Ink | | | | |
|---|---|---|---|---|---|
| | First water-soluble organic solvent (added amount (%)) | Second water-soluble organic solvent (added amount (%)) | Silicone oil | Urethane resin | Ink preparation method |
| Example 1 | glycerin (20.0) | 1,3-butanediol (10.0) | A | a | method 1 |
| Example 2 | glycerin (20.0) | 1,3-butanediol (10.0) | A | a | method 1 |
| Example 3 | glycerin (20.0) | 1,3-butanediol (10.0) | A | a | method 1 |
| Example 4 | glycerin (20.0) | 1,3-butanediol (10.0) | A | a | method 1 |
| Example 5 | glycerin (20.0) | 1,3-butanediol (10.0) | A | a | method 1 |
| Example 6 | glycerin (20.0) | 1,3-butanediol (10.0) | A | a | method 1 |
| Example 7 | glycerin (20.0) | 1,3-butanediol (10.0) | A | a | method 1 |
| Example 8 | glycerin (20.0) | 1,3-butanediol (10.0) | A | a | method 1 |
| Example 9 | glycerin (20.0) | 1,3-butanediol (10.0) | A | a | method 1 |
| Example 10 | glycerin (20.0) | 1,3-butanediol (10.0) | A | a | method 1 |
| Example 11 | glycerin (20.0) | 1,3-butanediol (10.0) | A | a | method 1 |
| Example 12 | glycerin (20.0) | 1,3-butanediol (10.0) | A | a | method 1 |

TABLE 5-1-3

| | Particle diameter | | | |
|---|---|---|---|---|
| | Number of coarse particles with diameter of not less than 0.5 μm ($10^4$ pieces/5.0 μl) | Volume average particle diameter D50 (nm) | 90% cumulative particle diameter D90 (nm) | Viscosity (mPa·s) |
| Example 1 | 98 | 102 | 175 | 7.5 |
| Example 2 | 52 | 98 | 172 | 7.5 |

TABLE 5-1-3-continued

| | Particle diameter | | | |
|---|---|---|---|---|
| | Number of coarse particles with diameter of not less than 0.5 μm ($10^4$ pieces/5.0 μl) | Volume average particle diameter D50 (nm) | 90% cumulative particle diameter D90 (nm) | Viscosity (mPa·s) |
| Example 3 | 196 | 104 | 178 | 7.5 |
| Example 4 | 99 | 82 | 165 | 7.5 |
| Example 5 | 97 | 119 | 195 | 7.5 |
| Example 6 | 98 | 100 | 161 | 7.5 |
| Example 7 | 99 | 100 | 199 | 7.5 |
| Example 8 | 95 | 101 | 170 | 7.5 |
| Example 9 | 145 | 88 | 165 | 7.5 |
| Example 10 | 105 | 105 | 188 | 7.5 |
| Example 11 | 125 | 92 | 176 | 7.5 |
| Example 12 | 185 | 115 | 195 | 7.5 |

TABLE 5-2-1

| | Carbon dispersion | | | | |
|---|---|---|---|---|---|
| | Carbon (BET specific surface area ($m^2/g$)) | Surfactant | Weight ratio of surfactant | Dispersing time (minutes) | Acceleration of gravity, and centrifugal treatment time (min) |
| Example 13 | α (gas black) (110) | II | 0.07 | 20 | 8000 20 |
| Example 14 | α (gas black) (110) | III | 0.07 | 20 | 8000 20 |
| Example 15 | α (gas black) (110) | IV | 0.07 | 20 | 8000 20 |
| Example 16 | α (gas black) (110) | V | 0.07 | 20 | 8000 20 |
| Example 17 | α (gas black) (110) | VI | 0.07 | 20 | 8000 20 |
| Example 18 | α (gas black) (110) | I | 0.01 | 20 | 10000 35 |
| Example 19 | α (gas black) (110) | I | 0.50 | 20 | 8000 20 |
| Example 20 | α (gas black) (110) | I | 0.005 | 20 | 10000 35 |
| Example 21 | α (gas black) (110) | I | 0.55 | 20 | 8000 20 |
| Example 22 | α (gas black) (110) | I | 0.07 | 20 | 8000 20 |
| Example 23 | α (gas black) (110) | I | 0.07 | 20 | 8000 20 |
| Example 24 | α (gas black) (110) | I | 0.07 | 20 | 8000 20 |
| Example 25 | α (gas black) (110) | I | 0.07 | 20 | 8000 20 |

TABLE 5-2-2

| | Ink | | | | |
|---|---|---|---|---|---|
| | First water-soluble organic solvent (added amount (%)) | Second water-soluble organic solvent (added amount (%)) | Silicone oil | Urethane resin | Ink preparation method |
| Example 13 | glycerin (20.0) | 1,3-butanediol (10.0) | A | a | method 1 |
| Example 14 | glycerin (20.0) | 1,3-butanediol (10.0) | A | a | method 1 |
| Example 15 | glycerin (20.0) | 1,3-butanediol (10.0) | A | a | method 1 |
| Example 16 | glycerin (20.0) | 1,3-butanediol (10.0) | A | a | method 1 |
| Example 17 | glycerin (20.0) | 1,3-butanediol (10.0) | A | a | method 1 |
| Example 18 | glycerin (20.0) | 1,3-butanediol (10.0) | A | a | method 1 |
| Example 19 | glycerin (20.0) | 1,3-butanediol (10.0) | A | a | method 1 |
| Example 20 | glycerin (20.0) | 1,3-butanediol (10.0) | A | a | method 1 |
| Example 21 | glycerin (20.0) | 1,3-butanediol (10.0) | A | a | method 1 |
| Example 22 | glycerin (10.0) | 1,3-butanediol (10.0) | A | a | method 1 |
| Example 23 | glycerin (20.0) | 1,3-butanediol (20.0) | A | a | method 1 |
| Example 24 | glycerin (8.0) | 1,3-butanediol (10.0) | A | a | method 1 |
| Example 25 | glycerin (20.0) | 1,3-butanediol (22.0) | A | a | method 1 |

TABLE 5-2-3

| | Particle diameter | | | |
|---|---|---|---|---|
| | Number of coarse particles with diameter of not less than 0.5 μm ($10^4$ pieces/5.0 μl) | Volume average particle diameter D50 (nm) | 90% cumulative particle diameter D90 (nm) | Viscosity (mPa·s) |
| Example 13 | 99 | 99 | 173 | 7.5 |
| Example 14 | 101 | 104 | 172 | 7.5 |
| Example 15 | 95 | 96 | 168 | 7.5 |
| Example 16 | 97 | 97 | 169 | 7.5 |
| Example 17 | 165 | 114 | 192 | 7.5 |
| Example 18 | 125 | 106 | 189 | 7.5 |
| Example 19 | 99 | 98 | 177 | 7.7 |
| Example 20 | 132 | 117 | 194 | 7.5 |
| Example 21 | 97 | 94 | 166 | 7.7 |
| Example 22 | 98 | 92 | 173 | 6.0 |
| Example 23 | 98 | 102 | 170 | 10.0 |
| Example 24 | 98 | 95 | 168 | 5.8 |
| Example 25 | 98 | 97 | 169 | 10.2 |

TABLE 5-3-1

| | Carbon dispersion | | | | |
|---|---|---|---|---|---|
| | Carbon (BET specific surface area ($m^2/g$)) | Surfactant | Weight ratio of surfactant | Dispersing time (minutes) | Acceleration of gravity, and centrifugal treatment time (min) |
| Comparative Example 1 | α (gas black) (110) | I | 0.07 | 41 | 10000 40 |
| Comparative Example 2 | α (gas black) (110) | I | 0.07 | 9 | 8000 20 |
| Comparative Example 3 | α (gas black) (110) | I | 0.07 | 24 | 8000 20 |
| Comparative Example 4 | α (gas black) (110) | I | 0.07 | 18 | 8000 20 |
| Comparative Example 5 | α (gas black) (110) | I | 0.07 | 20 | 10000 45 |
| Comparative Example 6 | α (gas black) (110) | I | 0.07 | 20 | 4000 8 |
| Comparative Example 7 | α (gas black) (110) | I | 0.07 | 41 | 8000 20 |
| Comparative | α (gas black) | I | 0.07 | 41 | 8000 |

TABLE 5-3-1-continued

<table>
<tr><th colspan="6">Carbon dispersion</th></tr>
<tr><th></th><th>Carbon (BET specific surface area (m²/g))</th><th>Surfactant</th><th>Weight ratio of surfactant</th><th>Dispersing time (minutes)</th><th>Acceleration of gravity, and centrifugal treatment time (min)</th></tr>
<tr><td>Example 8</td><td>(110)</td><td></td><td></td><td></td><td>20</td></tr>
<tr><td>Comparative Example 9</td><td>α (gas black) (110)</td><td>I</td><td>0.07</td><td>20</td><td>8000 20</td></tr>
<tr><td>Comparative Example 10</td><td>α (gas black) (110)</td><td>I</td><td>0.07</td><td>20</td><td>8000 20</td></tr>
</table>

TABLE 5-3-2

<table>
<tr><th colspan="6">Ink</th></tr>
<tr><th></th><th>First water-soluble organic solvent (added amount (%))</th><th>Second water-soluble organic solvent (added amount (%))</th><th>Silicone oil</th><th>Urethane resin</th><th>Ink preparation method</th></tr>
<tr><td>Comparative Example 1</td><td>glycerin (20.0)</td><td>1,3-butanediol (10.0)</td><td>A</td><td>a</td><td>method 1</td></tr>
<tr><td>Comparative Example 2</td><td>glycerin (20.0)</td><td>1,3-butanediol (10.0)</td><td>A</td><td>a</td><td>method 1</td></tr>
<tr><td>Comparative Example 3</td><td>glycerin (20.0)</td><td>1,3-butanediol (10.0)</td><td>A</td><td>a</td><td>method 1</td></tr>
<tr><td>Comparative Example 4</td><td>glycerin (20.0)</td><td>1,3-butanediol (10.0)</td><td>A</td><td>a</td><td>method 1</td></tr>
<tr><td>Comparative Example 5</td><td>glycerin (20.0)</td><td>1,3-butanediol (10.0)</td><td>A</td><td>a</td><td>method 1</td></tr>
<tr><td>Comparative Example 6</td><td>glycerin (20.0)</td><td>1,3-butanediol (10.0)</td><td>A</td><td>a</td><td>method 1</td></tr>
<tr><td>Comparative Example 7</td><td>glycerin (20.0)</td><td>1,3-butanediol (10.0)</td><td>A</td><td>b</td><td>method 1</td></tr>
<tr><td>Comparative Example 8</td><td>glycerin (20.0)</td><td>1,3-butanediol (10.0)</td><td>B</td><td>a</td><td>method 1</td></tr>
<tr><td>Comparative Example 9</td><td>glycerin (20.0)</td><td>1,3-butanediol (10.0)</td><td>C</td><td>a</td><td>method 1</td></tr>
<tr><td>Comparative Example 10</td><td>glycerin (20.0)</td><td>1,3-butanediol (10.0)</td><td>A</td><td>a</td><td>method 2</td></tr>
</table>

TABLE 5-3-3

<table>
<tr><th></th><th colspan="4">Particle diameter</th></tr>
<tr><th></th><th>Number of coarse particles with diameter of not less than 0.5 μm (10⁴ pieces/5.0 μl)</th><th>Volume average particle diameter D50 (nm)</th><th>90% cumulative particle diameter D90 (nm)</th><th>Viscosity (mPa·s)</th></tr>
<tr><td>Comparative Example 1</td><td>48</td><td>97</td><td>172</td><td>7.5</td></tr>
<tr><td>Comparative Example 2</td><td>202</td><td>110</td><td>184</td><td>7.5</td></tr>
<tr><td>Comparative Example 3</td><td>99</td><td>77</td><td>176</td><td>7.5</td></tr>
<tr><td>Comparative Example 4</td><td>96</td><td>124</td><td>177</td><td>7.5</td></tr>
<tr><td>Comparative Example 5</td><td>94</td><td>92</td><td>153</td><td>7.5</td></tr>
<tr><td>Comparative Example 6</td><td>121</td><td>112</td><td>208</td><td>7.5</td></tr>
<tr><td>Comparative Example 7</td><td>99</td><td>112</td><td>199</td><td>7.5</td></tr>
<tr><td>Comparative Example 8</td><td>98</td><td>99</td><td>172</td><td>7.5</td></tr>
<tr><td>Comparative Example 9</td><td>99</td><td>101</td><td>168</td><td>7.5</td></tr>
<tr><td>Comparative Example 10</td><td>44</td><td>74</td><td>155</td><td>7.5</td></tr>
</table>

Each of the inkjet inks of Examples 1-25 and Comparative Examples 1-10 was contained in an ink pack for an inkjet printer IPSIO GX5000 from Ricoh Co., Ltd. to prepare ink cartridges.

The inkjet inks were evaluated by the following methods.

1. Image Density of Image Formed by the Ink

An ink cartridge was set in the printer (IPSIO GX5000), and a black solid image with a size of 4 cm long and 4 cm wide was formed on a paper for plain paper copiers, XEROX 4200 from Xerox Corp. The optical density of the solid image was measured with a spectrophotometer X-RITE 938 from X-Rite Corp. The image density was graded as follows.

◯: The optical density is not less than 1.30. (Good)

Δ: The optical density is less than 1.30 and not less than 1.20. (Acceptable)

X: The optical density is less than 1.20. (Bad)

2. Glossiness of Image Formed by the Ink

An ink cartridge was set in the printer (IPSIO GX5000), and a black solid image with a size of 4 cm long and 4 cm wide was formed on a glossy paper prepared by the below-mentioned method. In this regard, the printing conditions of the printer were as follows.

Kind of recording medium: Glossy paper

Print mode: Clear mode (fine mode)

The 75° glossinesses of the image portion and a non-image portion of the glossy paper were measured by a gloss meter VG2000 from Nippon Denshoku Industries Co., Ltd. to determine the following glossiness ratio:

$$\text{Glossiness ratio}(\%) = (Gi/Gn) \times 100$$

wherein Gi represents the glossiness of the image portion and Gn represents the glossiness of the non-image portion.

The glossiness property of the ink was graded as follows.

◯: The glossiness ratio is not less than 90% and not greater than 100%. (Good)

Δ: The glossiness ratio is not less than 70% and less than 90%. (Acceptable)

X: The glossiness ratio is less than 70%. (Bad)

The glossy paper was prepared by the following method.

(1) Preparation of Paper Web

The following components were used as the raw paper material of the paper web.

| | |
|---|---|
| L-Breached Kraft Pulp (freeness of 480 ml) | 70 parts |
| N-Breached Kraft Pulp (freeness of 500 ml) | 30 parts |
| Cationized starch | 0.5 parts |
| Alkylketene dimer | 0.05 parts |
| Aluminum sulfate | 2 parts |
| Calcium carbonate | 10 parts |

A paper web was prepared using the above-mentioned raw paper material and a fourdrinier, followed by three-step wet press drying and machine-calendering. Thus, a paper web having a weight of 80 g/m² was prepared.

(2) Preparation of Glossy Paper

The following components were mixed to prepare a coating liquid.

| | |
|---|---|
| Kaolin (DB-KOTE from Imerys Minerals Japan K.K.) | 70 parts |
| Silica | 30 parts |
| SB latex (binder resin) | 8 parts |
| (having a glass transition temperature of 15° C.) | |
| Oxidized starch (binder resin) | 1 part |
| (MERMAID 210 from Shikishima Starch Mfg. Co., Ltd.) | |
| Sodium hydroxide | 0.1 parts |
| Sodium salt of polyacrylic acid (dispersant) | 0.2 parts |
| Water | proper amount |

Thus a coating liquid having a solid content of 65% by weight was prepared.

The coating liquid was applied on the surface of the paper web using a blade coater so that the coating weight is 12 g/m².

The coated paper web was dried to an extent such that the resultant coated paper includes water in an amount of 5% by weight. The coated paper was then subjected to a super calendering treatment so that the coated layer of the coated paper has a 75° glossiness of 70%.

3. Ejection Stability of Ink

Twenty (20) copies of an original image having an image area proportion of 5% were continuously produced by the above-mentioned inkjet printer, to which an ink cartridge is set, under an environmental condition of 32° C. and 30% RH, and then the image forming operation was stopped for 20 minutes. After the image forming operation and the 20-minute pause thereafter was repeated 50 times to produce 1,000 copies.

In this regard, the recording conditions of the printer were as follows.

Duty: 100%

Record density: 300 dpi

Recording method: One-pass recording method (recording is performed only when the recording head is moved forward)

After production of 1,000 copies, a nozzle check pattern image was formed to determine the number of omissions of dot images in the nozzle check pattern image.

The ejection stability was graded as follows.

○: The image has no omission. (Good)

Δ: The image has omissions of not greater than 10. (Acceptable)

X: The image has omissions of greater than 10. (Bad)

4. Preservability of Ink

After the average particle diameter, the surface tension and the viscosity of an inkjet ink were measured, the ink was contained in a polyethylene container and the container was sealed. The sealed container was allowed to settle for 3 weeks in a chamber heated to 70° C. After the preservation test, the average particle diameter, the surface tension and the viscosity of the ink were measured again to determine the change rates of the properties.

The preservability was graded as follows.

○: The change rates of the properties are within 10%. (Good)

Δ: The change rates of the properties are greater than 10% and less than 30%. (Acceptable)

X: The change rates of the properties are greater than 30%. (Bad)

5. Antifoaming Property of the Ink

Ten (10) milliliter of an inkjet ink was contained in a predetermined cylinder (L480) having a diameter of 65 mm and scales of from 0 to 1000 ml at an interval of 10 ml. The temperature of the cylinder containing the ink was controlled to be 25° C. Next, an air feeding pipe was set so that the tip of the pipe is contacted with the bottom surface of the cylinder, and air was fed for 5 minutes at a flow rate of 94 ml/min. At a time 10 minutes after stopping the air feeding operation, the volume of the foamed portion of the ink was measured.

○: The volume of the foamed portion is not greater than 50 ml. (Good)

Δ: The volume of the foamed portion is greater than 50 ml and not greater than 100 ml. (Acceptable)

X: The volume of the foamed portion is greater than 100 ml. (Bad)

The evaluation results are shown in Table 6 below.

TABLE 6

| | Image density | Glossiness | Ejection stability | Preservability | Foaming property |
|---|---|---|---|---|---|
| Example 1 | ○ | ○ | ○ | ○ | ○ |
| Example 2 | Δ | ○ | ○ | Δ | ○ |
| Example 3 | ○ | Δ | ○ | ○ | ○ |
| Example 4 | Δ | ○ | ○ | Δ | ○ |
| Example 5 | ○ | Δ | Δ | ○ | ○ |
| Example 6 | Δ | ○ | ○ | Δ | ○ |
| Example 7 | ○ | Δ | Δ | ○ | ○ |
| Example 8 | Δ | ○ | ○ | ○ | ○ |
| Example 9 | ○ | ○ | ○ | Δ | ○ |
| Example 10 | Δ | Δ | ○ | ○ | ○ |
| Example 11 | ○ | ○ | Δ | Δ | ○ |
| Example 12 | Δ | Δ | ○ | ○ | ○ |
| Example 13 | ○ | ○ | ○ | Δ | ○ |
| Example 14 | ○ | ○ | Δ | ○ | ○ |
| Example 15 | ○ | ○ | Δ | Δ | ○ |
| Example 16 | ○ | ○ | Δ | Δ | ○ |
| Example 17 | Δ | ○ | Δ | ○ | Δ |
| Example 18 | ○ | ○ | ○ | Δ | ○ |
| Example 19 | ○ | ○ | Δ | ○ | Δ |
| Example 20 | ○ | ○ | Δ | Δ | ○ |
| Example 21 | ○ | ○ | Δ | Δ | Δ |
| Example 22 | Δ | ○ | ○ | ○ | ○ |
| Example 23 | ○ | ○ | Δ | ○ | ○ |
| Example 24 | Δ | Δ | Δ | ○ | ○ |
| Example 25 | Δ | ○ | Δ | Δ | ○ |
| Comp. Ex. 1 | X | ○ | ○ | X | ○ |
| Comp. Ex. 2 | ○ | X | Δ | ○ | ○ |
| Comp. Ex. 3 | X | ○ | ○ | X | ○ |
| Comp. Ex. 4 | ○ | X | X | ○ | ○ |
| Comp. Ex. 5 | X | ○ | ○ | X | ○ |
| Comp. Ex. 6 | ○ | X | X | ○ | ○ |
| Comp. Ex. 7 | X | Δ | Δ | X | Δ |
| Comp. Ex. 8 | ○ | ○ | Δ | Δ | X |
| Comp. Ex. 9 | ○ | Δ | X | Δ | X |
| Comp. Ex. 10 | X | ○ | Δ | X | Δ |

The summary of the evaluation results is as follows.

(1) The inks of Examples 1-7 are superior to the inks of Comparative Examples 1-6 in all the properties (i.e., image density, glossiness, ejection stability, preservability and antifoaming property). This is because the number of coarse particles, and the particle diameters D50 and D90 of the inks of Comparative Examples 1-6 do not fall in the preferable ranges.

The inks of Examples 1-7 are superior to the ink of Comparative Example 7 in image density, and preservability. This is because the ink of Comparative Example 7 uses a polycarbonate type polyurethane resin.

The inks of Examples 1-7 are superior to the inks of Comparative Examples 8 and 9 in antifoaming property. This is because the inks of Comparative Examples 8 and 9 do not use a polyether-modified silicone oil.

(2) The ink of Example 8 is superior to the ink of Example 10 in glossiness, and the ink of Example 9 is superior to the ink of Example 11 in ejection stability. This is because the BET specific surface areas of the carbon blacks included in the inks of Examples 10 and 11 do not fall in the preferable range.

The inks of Examples 8 and 9 are superior to the ink of Example 12 in image density and glossiness. This is because the carbon black included in the ink of Example 12 is not a gas black and is a furnace black.

(3) The ink of Example 13 is superior to the ink of Example 15 in ejection stability, and the ink of Example 14 is superior to the ink of Example 16 in preservability. This is because the total amount of a dimer, a trimer and a tetramer of the naphthalene sulfonic acid of the sodium salt of formalin condensate of naphthalenesulfonic acid included in the inks of Examples 15 and 16 does not fall in the preferable range.

The ink of Example 18 is superior to the ink of Example 20 in ejection stability, and the ink of Example 19 is superior to the ink of Example 21 in preservability. This is because the contents of the surfactant included in the inks of Examples 20 and 21 do not fall in the preferable range.

The inks of Examples 13, 14, 18 and 19 are superior to the ink of Example 17 in image density, ejection stability, and antifoaming property. This is because the surfactant included in the ink of Example 17 is not a sodium salt of formalin condensate of naphthalenesulfonic acid.

(4) The ink of Example 22 is superior to the ink of Example 24 in ejection stability, and the ink of Example 23 is superior to the ink of Example 25 in image density. This is because the viscosities of the inks of Examples 24 and 25 do not fall in the preferable range.

(5) The ink of Example 1 is superior to the ink of Comparative Example 10 in image density and preservability. This is because the ink of Comparative Example 10 is not prepared by the method and is prepared by the method.

Additional modifications and variations of the present invention are possible in light of the above teachings. It is therefore to be understood that within the scope of the appended claims the invention may be practiced other than as specifically described herein.

What is claimed is:

1. An inkjet ink comprising:
    a carbon black;
    a surfactant;
    a polyether-modified silicone oil having a polyoxyalkylene group in a side chain;
    an anionic self-emulsifying polyether-modified polyurethane resin having a polyoxyalkylene group in a main chain; and
    water,
    wherein the inkjet ink contains particles having a particle diameter of not less than 0.5 μm in an amount of from 500,000 to 2,000,000 pieces per 5.0 μl, and has a volume average particle diameter (D50) of from 80 nm to 120 nm and a 90% cumulative particle diameter (D90) of from 160 nm to 200 nm.

2. The inkjet ink according to claim 1, wherein the carbon black is a gas black having a BET specific surface area of from 100 $m^2/g$ to 400 $m^2/g$.

3. The inkjet ink according to claim 1, wherein the surfactant is a sodium salt of formalin condensate of naphthalenesulfonic acid, wherein the formalin condensate of naphthalenesulfonic acid includes a dimer, a trimer and a tetramer of naphthalenesulfonic acid in a total amount of from 20% to 80% by weight based on a total weight of the formalin condensate, and wherein the surfactant is included in the inkjet ink in an amount of from 0.01 parts to 0.50 parts by weight based on 1 part by weight of the carbon black.

4. The inkjet ink according to claim 1, wherein the inkjet ink has a viscosity of from 6.0 to 10.0 mPa·s.

5. An ink cartridge comprising:
    a container; and
    the inkjet ink according to claim 1 contained in the container.

6. An inkjet recording apparatus comprising:
    the ink cartridge according to claim 5; and
    a recording head to eject the inkjet ink contained in the ink cartridge to form an ink image on a recording medium.

7. A print comprising:
    a support; and
    an ink image of the inkjet ink according to claim 1 located on the support.

* * * * *